United States Patent [19]

Husted

[11] Patent Number: 4,717,369

[45] Date of Patent: * Jan. 5, 1988

[54] INCREMENTALLY VARIABLE TRANSMISSION

[75] Inventor: Royce H. Husted, 711 Lakeside Dr., Wheaton, Ill. 60187

[73] Assignees: Royce Husted; Samuel Shiber, both of Wheaton, Ill.

[*] Notice: The portion of the term of this patent subsequent to Jan. 15, 2001 has been disclaimed.

[21] Appl. No.: 925,541

[22] Filed: Oct. 27, 1986

Related U.S. Application Data

[63] Continuation-in-part of Ser. No. 643,031, Aug. 21, 1984, Pat. No. 4,645,475, which is a continuation-in-part of Ser. No. 456,736, Jan. 10, 1983, Pat. No. 4,521,207, which is a continuation-in-part of Ser. No. 387,618, Jun. 11, 1982, Pat. No. 4,493,678, which is a continuation-in-part of Ser. No. 310,506, Oct. 13, 1981, abandoned.

[51] Int. Cl.[4] .................... F16H 55/30; F16H 55/54
[52] U.S. Cl. ........................................ 474/49; 474/56
[58] Field of Search ............... 474/47, 49, 52, 54, 474/56, 57, 164

[56] References Cited

U.S. PATENT DOCUMENTS 4,325,702  4/1982  Jacobsson et al. ................ 474/56
4,493,678  1/1985  Husted ........................... 474/49 X

FOREIGN PATENT DOCUMENTS 0453712  9/1936  United Kingdom ............... 474/49

Primary Examiner—Stephen J. Novosad
Assistant Examiner—Thuy M. Bui
Attorney, Agent, or Firm—Samuel Shiber

[57] ABSTRACT

An incrementally variable transmission, particularly suitable for a bicycle, having a variable-sprocket mounted on an axle having crank-arms. The variable-sprocket comprises a drive-flange and a indexing-flange, a pair of sprocket-segment-planets and at least a pair of idler-planets connected to the flanges, the planets adapted to expand and contract in response to a relative rotation of the flanges and thereby increase and decrease, respectively, the effective diameter of the variable-sprocket, and the sprocket-segment-planets are arranged along an imaginary line defined by said crank-arms.

2 Claims, 14 Drawing Figures

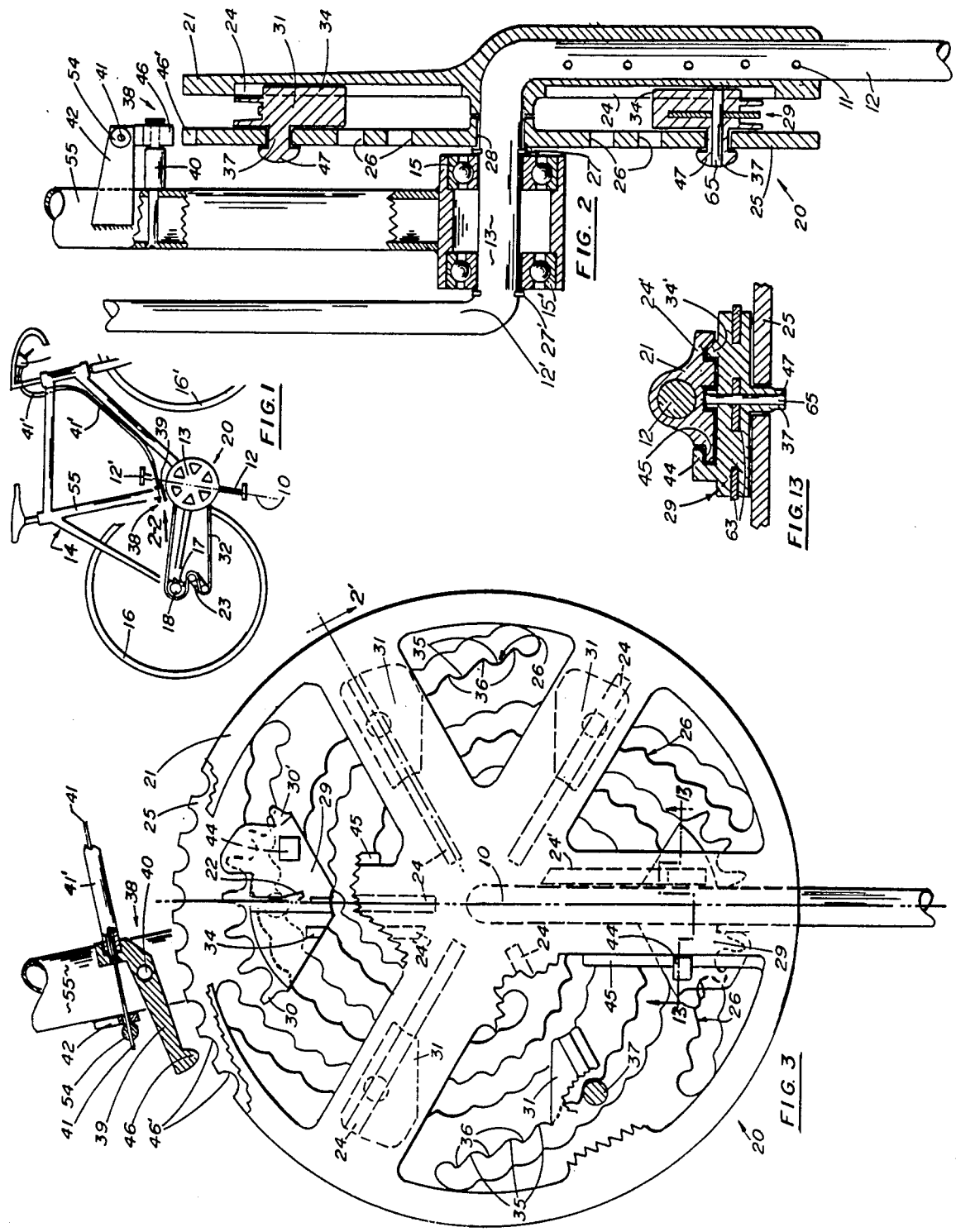

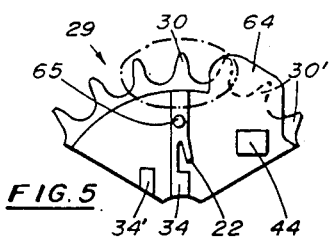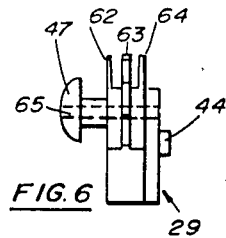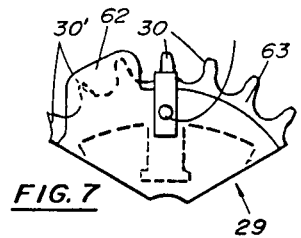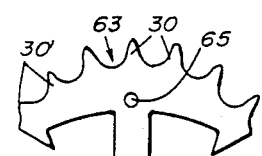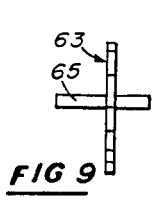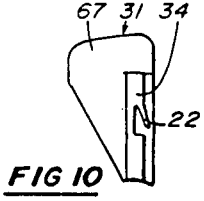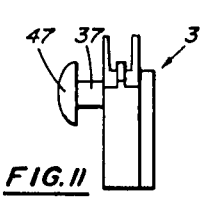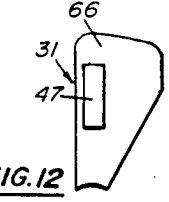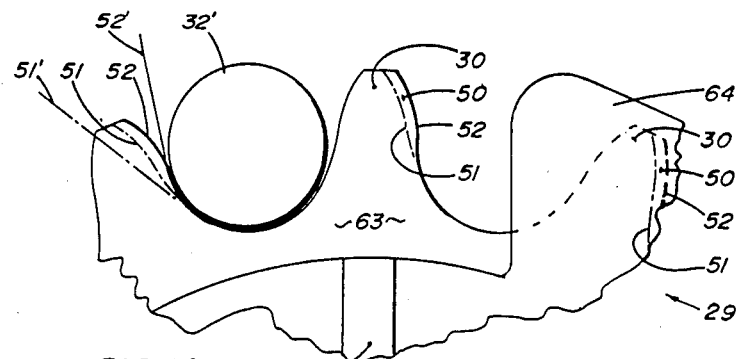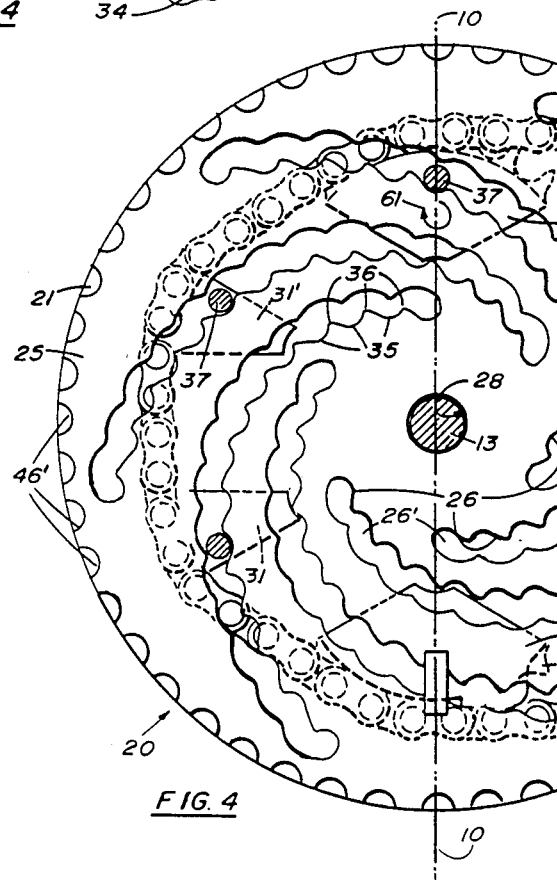

INCREMENTALLY VARIABLE TRANSMISSION

This application is a continuation-in-part of my pending application Ser. No. 643,031 filed on Aug. 21, 1984 now U.S. Pat. No. 4,645,475, which is a continuation-in-part of my application Ser. No. 456,736 filed on Jan. 10, 1983 now U.S. Pat. No. 4,521,207 which is a continuation-in-part of my application Ser. No. 387,618 filed on June 11, 1982 now U.S. Pat. No. 4,493,678, which is a continuation-in-part of my application Ser. No. 310,506 filed on Oct. 13, 1981 now abandoned.

BACKGROUND AND OBJECTIVES OF THE INVENTION

Conventional ten speed bicycle transmissions consist of a chain wrapped around a front double sprocket and a rear cluster containing five sprockets, a front and rear derailleurs for derailing the chain from one sprocket to another in response to a rider moving two control levers which are connected to the derailleurs. The derailleurs are made of a large number of delicate parts which need frequent maintenance and adjustment, and are easily damaged. The derailleur system is also hard to operate, it generates continuous noise and inefficiencies in certain gears due to the chain's misalignment. To reduce the misalignment thin sprockets and a narrow chain are used. This narrow chain is also designed to withstand the repeated sharp double bend that is imposed by the rear derailleur's tensioner, and it is manufactured without a connecting link which would interfere with the adjacent sprockets and the tensioner's cage. Because of the popularity of the derailleur system this narrow chain is available throughout the industry and in every bicycle repair shop, and it is commercially advantageous to incorporate this chain in any new competing transmission system.

Due to the derailleur system deficiencies several attempts have been made in the past to introduce different systems, some of which are based on variable-sprockets. An example is found in British Pat. No. 453,712 by Neale which is incorporated by reference herein. However, this and other designs while being workable lacked the degree of refinement to be commercially successful especially in the area of synchronization of the sprocket-segment-planet with the chain. Under the stress of transmitting the rider's power to the wheel the variable-sprocket slightly deforms, interfering with the synchronization: therefore, it is best to arrange the engagement and disengagement of the sprocket-segment-planet and the chain to occur when the stresses and the accompanying deformations are at their lowest level.

An object of the present invention is to overcome these and other deficiencies of the prior art, and to provide a simple durable system which can be economically mass produced.

SUMMARY OF THE INVENTION

An incrementally variable transmission providing a plurality of distinct transmission gear ratios particularly suitable for bicycles. The transmission is based on a variable-sprocket comprising a drive-flange and an indexing-flange mounted on an axle with a pair of sprocket-segment-planets and at least two idler-planets sandwiched between and slidably connected to the flanges forming a relatively rigid structure. The planets are adapted to expand and contract in response to a relative rotation of the flanges and thereby increase or decrease the effective diameter of the variable-sprocket (the effective diameter, as used herein, shall mean the length of chain pulled by the sprocket per revolution, divided by 3.14).

In the present invention the location of the planets is such that when the sprocket-segment-planet engages with the chain it takes over the chain's load from the previously engaged sprocket-segment-planet allowing the previously engaged sprocket-segment-planet to become disengaged from the chain.

In order to make the load transition between the sprocket-segment-planets smooth keeping the synchronization between the sprocket-segment-planet and the chain is important, therefore, it is preferred to do it when a minimum amount of power is transmitted through the system. The transition occurs when the sprocket-segment-planets are at their top/bottom position, and since, as previously mentioned a rider usually pedals lighter when the crank-arms are at their top/bottom position, arranging the crank-arms and the sprocket-segment-planets along the same (imaginary) line will automatically assure that the engagement of one sprocket-segment-planet and the subsequent disengagement of the other sprocket-segment-planet will all happen when low power level is transmitted through the system.

BRIEF DESCRIPTION OF THE FIGURES

FIG. 1 shows a side view of a bicycle equipped with an incrementally variable transmission according to the present invention, FIG. 2 shows a portion of the bicycle and the variable-sprocket sectioned along an imaginary line 10 marked on FIG. 1 as viewed in the direction pointed by an arrow 2—2 also marked on FIG. 1, FIG. 3 shows a partially broken front view of the variable-sprocket, FIG. 4 shows a rear view of the variable-sprocket with three of the six locking means removed, FIGS. 5, 6 and 7 show front, side and rear views, respectively, of a sprocket-segment-planet, FIGS. 8 and 9 show rear and side views, respectively, of a steel insert fitted with a cross pin, around which the sprocket-segment-planet is molded, FIGS. 10, 11 and 12 show front, side and rear views, respectively, of an idler-planet, FIG. 13 shows a cross section of an area of the variable-sprocket which contains sprocket-segment-planet, as viewed along section line 13—13 marked on FIG. 3, and FIG. 14 shows an enlarged area of the sprocket-segment-planet which is marked on FIG. 5 by an eliptical phantom line.

DESCRIPTION OF THE SPECIFIC EMBODIMENT

The attached figures show a bicycle (FIG. 1) having a frame 14, with a seat post member 55, crank-arms 12 and 12' which are integral with an axle 13 (FIG. 2). The axle 13 is rotatably mounted in the frame by means of ball-bearing 15 and 15' which are secured to the axle 13 by snap-rings 27 and 27'. Rear and front wheels 16 and 16' are also rotatably mounted to the frame 14 in a conventional manner. The bicycle is equipped with an incrementally variable transmission comprising a variable-sprocket 20 which is coupled by a roller-chain 32, preferably of the type used with conventional derailleur systems, to a sprocket 17 which, in turn, is conventionally coupled to the rear wheel 16 via a one-way clutch 18.

The sprocket 20 (FIGS. 2, 3, 4 and 13) has:

A drive-flange 21 molded onto the crank-arm 12 which has dimples 11 to improve the mechanical bond and assure a rigid connection with the flange 21, an indexing-flange 25, having a round bore 28, is rotatably mounted on the axle 13 opposite the drive-flange 21 and has a plurality of spiral-wavy-cams 26, two sprocket-segment-planets 29 (identical elements, or identical parts thereof, will be identified by same numbers) and four idler-planets 31 and 31' (planet 31' is a mirror image of planet 31) sandwiched between the flanges 21 and 25, keys 34 and 34' slidable in their respective radial keyways 24 and 24', for tangentially connecting the planets to the drive-flange 21, cam-follower 37 attached to each of the planets 29, 31 and 31', for engaging with and following their respective spiral-wavy-cam 26, the spiral-wavy-cam comprising a series of alternating depressions 35 and hills 36 (FIGS. 3 and 4). Whenever the cam-follower 37 moves from one depression to the next, it moves over the hill 36 at which point it is further away from the axle 13 than when it is seated in either of the depressions 35 between which it is moving. As the planet slides along the spiral-wavy-cam 26, from one depression to the next, the effective diameter of sprocket 20 decreases and increases, respectively, in response to a relative rotation between the flanges 21 and 25. Locking means 47 formed at the end of the cam-follower 37 slides along and engages an outer surface of the indexing-flange 25. Under working loads which may cause a slight deformation of the indexing-flange 25, the locking means 47 engages the outer surface of the indexing flange 25 and prevents the separation of the planets from it (the shape of the locking means 47 allows their insertion through slots 26' for attaching them to the indexing-flange 25). The sprocket-segment-planets 29 are equipped with additional locking means, in the form of a hook 44 which slides along and engages an outer surface 45 of the drive-flange 21, to resist together with the key 34 the tendency of the sprocket-segment-planet 29 to rotate (in a direction shown by circular arrow 61, FIG. 4) and twist due to the tangential force that the chain's load creates on teeth 30.

The planets 29, 31 and 31' each have a small cantilever spring 22 (FIGS. 3, 5 and 10) which is formed as a part of the key 34, to create a preload between the key 34 and the keyway 24 to prevent the planets from developing an annoying rattle while they are not engaged with the chain 32.

The chain 32 (FIG. 4) is wrapped around approximately one half of the sprocket 20, and engages with the teeth 30 that are located on a rounded section of the sprocket-segment-planets 29. Part of the leading teeth 30' is removed to prevent interference with the chain 32 when the incrementally variable transmission is in high gear ratios. The chain 32 is made of links and has a pitch length equalling the length of the chain 32 divided by the number of links contained in the chain. It should be noted that while a 10 speed bicycle's roller chain is preferred, the term chain covers other chains and toothed belts which could also be used for putting together the system.

The flanges 21 and 25 can be molded from plastic material such as, for example, polyester resin containing around 50% fiberglass reinforcement.

In the present invention the whole load is often carried by a single tooth 30, however, the width of the teeth 30 is limited by chain's narrowness, therefore, it is preferred to form the teeth 30 on an insert 63 made of a flat piece of hard steel (FIGS. 8 and 9). A cross pin 65 is inserted through the cam-follower, the insert 63 and the body of the sprocket-segment-planet, to strengthen it so that under load the accurate geometry of the sprocket 20 as a whole will be maintained. As will be discussed later on, this also contributes to the smooth operation of the sprocket 20. The sprocket-segment-planet 29 can be manufactured by molding plastic material, for example, nylon with 43% fiberglass reinforcement, around the insert 63 and the cross pin 65.

The sprocket-segment-planet and the idler-planet each have a pair of guide plates 62, 64 and 66, 67, respectively, on their top side to direct the chain onto the teeth 30. This is especially helpful in the case of a narrow chain where any slight misalignment will cause the chain to ride on top of the teeth.

As the bicycle is peddled, load is developed in the chain 32 which in turn creates tangential and radial loads on the planets. The tangential loads are taken by the sprocket-segment-planets 29 and are transmitted to the keys 34 and 34' which are formed on the side of each of the sprocket-segment-planets 29, and which engage with and slide in the radial keyway 24 and 24', respectively, transmitting these loads to the drive-flange 21. Radial loads which develop in the planets around which the chain 32 is wrapped, are transmitted to the spiral-wavy-cams 26, through the cam-followers 37 formed on the sides of the planets 29, 31 and 31'. The radial load secures and properly positions the planets in the depressions 35.

Since only a small fraction of the periphery of the sprocket 20 carries chain engaging teeth 30, it is preferred to design the shape of some of these teeth 30 so that they positively engage with rollers 32' of the chain, to prevent the chain from disengaging by escaping over the teeth, especially under dynamic loads which are associated with bicycling. To achieve the positive engagement of the chain's rollers 32' the design of the standard tooth shape of a commercial roller chain sprocket is modified (FIG. 14) by adding a section 50 which is designed between the phantom line 51 and line 52. The line 52 is the modified tooth shape. A phantom line 51' and a line 52' mark imaginary inclined planes on which the roller 32' has to climb, in order to disengage from the tooth 30, in the case of the commercial and the modified tooth shapes, respectively. The inclined plane 52' is so steep that it prevents the load in the chain from pulling the roller 32' over the tooth 30, whereas experience has shown that in the case of an unmodified commercial tooth shape the roller 32' may occasionally climb over the tooth.

The actual characteristics of the disengagement of the sprocket-segment-planet from the chain 32 may vary with the prevailing coefficient of friction between the roller 32' and the tooth 30. It is necessary to assure positive engagement with a low coefficient of friction, and to assure disengagement even when a high coefficient of friction prevails. Therefore, it is important to remove the load from the sprocket-segment-planet 29 which is about to disengage from the chain 32. The engagement of the one sprocket-segment-planet 29

(which takes place at the top of the sprocket 20) occurs slightly prior to the disengagement of the other sprocket-segment-planet 29 (which takes place at the bottom of the sprocket 20). Designing the sprocket-segment-planets' geometrical locations with the depressions 35 slightly displaced towards the axle 13 (relative to their theoretical position which corresponds to zero slack in the chain section which is engaged with and trapped between both sprocket-segment-planets 29) prevents the trapped chain from becoming taut. This assures that the chain's load has been transferred to the newly engaged sprocket-segment-planet 29 from the previously engaged sprocket-segment-planet 29, which becomes free to disengage from the chain 32. The small radial displacement of the depressions 35 which is required to assure the load transfer does not create excessive slack in the trapped chain or interfere with the operation of the sprocket 20 and the length of the trapped chain remains substantially an integral (natural) number of pitches when the sprocket 20 is operational in any of the gear ratios. Therefore, the synchronization (that is, the proper meshing) between the chain 32 and the teeth 30 is maintained. Excessive or insufficient slack would prevent proper synchronization of the chain 32 with the sprocket-segment-planet 29 at the point of their engagement, causing the teeth 30 to hit the roller 32'. Further, insufficient slack would not only prevent the engaging sprocket-segment-planet 29 from assuming the chain's load but instead it would generate an additional load in the trapped chain and between both of the sprocket-segment-planets 29, and may make the chain's disengagement from the sprocket 20 difficult. In view of the above, it can be appreciated that rigidizing the sprocket 20 in order to maintain the above geometrical relationships is essential and this is achieved by using various measures such as choice of materials, using the insert 63 and cross pin 65 as well as molding the drive flange directly onto the crank-arm 12. All these measures cooperate to achieve a commercially acceptable system.

The spiral-wavy-cams 26 and keyways 24 are arranged so that the sprocket-segment-planets 29 remain at substantially symmetrical positions relative to the axle 13, and that an imaginary line 10, marked on FIGS. 1, 3 and 4, which passes through the sprocket-segment-planets 29 will pass through the axle 13. Thereby, at least one sprocket-segment-planet 29 is engaged with the chain 32 at all times to maintain the power transmission between the sprockets 17 and 20, but most of the time only one sprocket-segment-planet 29 is engaged with the chain 32, allowing the transmission to change to a higher gear ratio (if the the sprocket-segment-planets 29 were clustered together, periodically, none would be engaged with the chain 32 which wraps approximately one half of the sprocket 20). Thus, as the sprocket 20 rotates, the chain 32 is engaged with one sprocket-segment-planet 29 or with the other, with a short transitional overlap during which both sprocket-segment-planets 29 are engaged.

In order to make the load transition between the sprocket-segment-planets 29 smooth, it is preferred to make it while a minimum amount of power is transmitted through the system. The transition occurs when the sprocket-segment-planets 29 are approximately at their top/bottom position, and since a rider usually pedals lighter when the crank-arms are at their top/bottom position, locating the crank-arms 12 and 12' and the sprocket-segment-planets 29 along the same imaginary line 10 will synchronize the minimum load condition and the load transition.

Each of the planets 29, 31 and 31', is engaged with its own respective keyways and the respective spiral-wavy-cam 26 which controls the radial location of the respective planet. Therefore, it is a designer's option to maintain all the planets at equal distances from the axle 13 or to move one opposing pair (planets 29 for example) further away from the axle 13 so that an imaginary ellipse can be drawn through planets 29, 30 and 31. When such a configuration of planets is orientated relative to the crank-arms 12 and 12', in accordance with a certain bioengineering theory, the utilization of rider's capabilities should be improved. Further, one of the planets 29 can be moved slightly further than the other in order to provide a slightly higher ratio when the rider's stronger foot, usually his right foot, pedals down. The planets 29 will still be maintained in substantially symmetrical positions relative to the axle 13. However, such refinements are probably worthwhile only for people who ride a bicycle competitively.

A brake assembly 38 (FIGS. 2 and 3) has arm 39 which is pivoted on a stud 40 which is affixed to the frame member 55. The arm 39 has a rounded pawl 46 which is adapted to engage and brake dimples 46' which are formed on the periphery of the indexing flange 25 in response to being pushed by an outer jacket 41' of the cable 41 which is secured to a bracket 42 by means of crimped ferrule 54. The cable 41 and its jacket 41' are connected, at their other end, to a conventional hand lever assembly 43 which the rider can depress in order to move the cable 41 relative to the jacket 41', and thereby engage the brake 38. When the indexing flange 25 is braked and the drive-flange 21 is rotated through the crank-arms 12 and 12', forward and backward, intersections of the keyways 24 and the spiral-wavy-cams 26 expand and contract together with the planets, respectively, causing the transmission to change to a high gear ratio .r[TENSIONER]

A tensioner mechanism 23 takes up chain's slack which develops when the planets are contracted.

The bicycle is ridden and pedaled like a conventional bicycle, with the improvement that lowering the transmission ratio (which is the effective diameter of the sprocket 20 divided by the effective diameter of the rear sprocket 17) is done by back pedaling while energizing the brake 38, thereby slowing the indexing-flange 25 relative to the drive-flange 21 and causing the intersection of the keyways 24 and the spiral-wavy-cam 26 to radially move towards the axle 13, contracting the planets 29, 31 and 31' and decreasing the effective diameter of the sprocket 20. The one-way-clutch 18 permits back pedaling even when the bicycle is stationary. Shifting to a higher ratio is achieved by braking and slowing the indexing-flange 25 relative to the drive-flange 21 while pedaling forward, expanding the planets and thereby increasing the effective diameter of the sprocket 20. As the planets are expanded or contracted, the cams 37 are moved from one depression 35 to the next and the length of trapped chain increases or decreases, respectively, by an integral (natural) number of pitches so that the length of the trapped chain remains substantially an integral number of pitches and, therefore, the sprocket-segment-planet 29 remains synchronized with the chain 32 at the point of engagement. When the planets shift over the hills 36, from one depression 35 to the next, the sprocket 20 momentarily goes out of synchronization with the chain 32, but, as soon as the cams 37 are reseated in the depressions 35 the synchronization of the chain 27 with the sprocket-segment-planet 29 is reestablished, assuring their proper mesh. If the cams 37 are not properly seated, the chain load pushes them into depressions 35. It is easier to shift the sprocket 20, especially to a higher ratio, when the chain's load is minimal, that is when the only tension in the chain 32 is created by the chain tensioner 23. Shifting the transmission to a lower ratio can be done while the bicycle is stationary, since the one-way-clutch 18 allows back pedaling when the rear wheel 16 is not rotating, and this allows a rider who stopped while being in a high ratio (at a traffic light, for example) to shift to a lower ratio to ease acceleration. Shifting to a higher ratio takes place while pedaling forward and when only one sprocket-segment-planet 29 is engaged with the chain, since during the transition period when both sprocket-segment-planets 29 are engaged the trapped chain momentarily prevents the planets from expanding.

While the present invention has been illustrated with one specific embodiment, it should be understood that modifications and substitutions can be made without departing from the spirit of the invention or the scope of the claims.

I claim:

1. A variable-sprocket mounted on an axle having crank-arms defining an imaginary line, comprising in combination:

a drive-flange and an indexing flange, two sprocket-segment-planets and at least two idler-planets, and planets being connected to said flanges and adapted to radially slide on them, means for radially expanding and contracting said planets in order to increase and decrease, respectively, the effective diameter of said sprocket, a chain which wraps approximately one half of said sprocket while being supported by said planets, said sprocket-segment-planets having teeth adapted to engage with said chain, said imaginary line passing through said sprocket-segment-planets.

2. The subject matter of claim 1, wherein said sprocket-segment-planets remain substantially symmetrical relative to said axle as they expand and contract so that at least one of said sprocket-segment-planets is engaged with said chain at all times and only one of said sprocket-segment-planets is engaged with said chain part of the time.

* * * * *